United States Patent
Aberg et al.

(10) Patent No.: US 10,137,849 B2
(45) Date of Patent: Nov. 27, 2018

(54) ARRANGEMENT FOR FACILITATING SELECTION AND ACTIVATION OF A VOICE CONTROL SYSTEM BY A VEHICLE OPERATOR

(71) Applicant: VOLVO CAR CORPORATION, Gothenburg (SE)

(72) Inventors: Nina Aberg, Gunnilse (SE); Fredrik Hildebrandsson, Romelanda (SE)

(73) Assignee: Volvo Car Corporation, Gothenburg (SE)

( * ) Notice: Subject to any disclaimer, the term of this patent is extended or adjusted under 35 U.S.C. 154(b) by 224 days.

(21) Appl. No.: 14/134,245

(22) Filed: Dec. 19, 2013

(65) Prior Publication Data

US 2014/0207471 A1    Jul. 24, 2014

(30) Foreign Application Priority Data

Jan. 21, 2013  (EP) ..................................... 13151988

(51) Int. Cl.
| | |
|---|---|
| *G10L 15/00* | (2013.01) |
| *B60R 16/037* | (2006.01) |
| *G10L 15/28* | (2013.01) |

(52) U.S. Cl.
CPC .......... *B60R 16/0373* (2013.01); *G10L 15/28* (2013.01)

(58) Field of Classification Search
CPC ....... G10L 15/00; G10L 15/065; G10L 15/07; G10L 15/20; G10L 15/24; G10L 15/30; G10L 15/34
USPC .............................. 704/275, 270, 270.1, 231
See application file for complete search history.

(56) References Cited

U.S. PATENT DOCUMENTS

| | | | |
|---|---|---|---|
| 5,371,901 A * | 12/1994 | Reed ..................... | H04M 1/725 |
| | | | 455/11.1 |
| 5,450,525 A | 9/1995 | Russell et al. | |
| 9,306,983 B2 * | 4/2016 | Boll ........................ | H04L 67/12 |
| 2005/0080606 A1 | 4/2005 | Ampunan et al. | |
| 2007/0219686 A1 | 9/2007 | Plante | |

(Continued)

FOREIGN PATENT DOCUMENTS

| | | |
|---|---|---|
| CN | 1410298 A | 4/2003 |
| CN | 1864164 A | 4/2005 |

OTHER PUBLICATIONS

Extended European Search Report for EP 13151988.6, Completed by the European Patent Office dated May 22, 2013, 5 Pages.

(Continued)

*Primary Examiner* — Qi Han
(74) *Attorney, Agent, or Firm* — Brooks Kushman P.C.

(57) ABSTRACT

An arrangement is provided for facilitating selection and activation of a voice control system by a vehicle operator. The arrangement may include a switch selectively switchable between a first switch position ($P_1$) and a second switch position ($P_2$) and arranged to emit a signal when switched between the switch positions ($P_1$, $P_2$). The arrangement may further include a processing unit arranged to select, based on an interpretation of the signal, one of the vehicle voice control system or a voice control system of an external communication device and to communicate an activation signal to the selected one of the vehicle voice control system and the external communication device voice control system.

16 Claims, 2 Drawing Sheets

(56) References Cited

U.S. PATENT DOCUMENTS

| | | | | |
|---|---|---|---|---|
| 2008/0118080 | A1* | 5/2008 | Gratke | B60R 16/0373 |
| | | | | 381/86 |
| 2011/0141855 | A1* | 6/2011 | Gault | G06Q 10/109 |
| | | | | 368/10 |
| 2011/0144980 | A1* | 6/2011 | Rysenga | G06Q 10/109 |
| | | | | 704/201 |
| 2012/0183221 | A1* | 7/2012 | Alasry | G10L 15/06 |
| | | | | 382/181 |
| 2013/0006479 | A1* | 1/2013 | Anderson | G07C 9/00111 |
| | | | | 701/49 |
| 2014/0120892 | A1* | 5/2014 | Martin | G10L 15/22 |
| | | | | 455/418 |

OTHER PUBLICATIONS

Website., www.ford-mobile-connectivity.com, Dated Jul. 15, 2011, 18 Pages, "Ford and your mobile phone. A clever connection.".
Chinese Patent Office, Office Action issued for Chinese Application CN 201310688391.6, dated Feb. 3, 2017, 8 pages.
Chinese Patent Office, Second Office Action issued for Chinese Application CN 201310688391.6, dated Aug. 25, 2017, 9 pages.
Chinese Patent Office, Search Report issued for Chinese Application CN 201310688391.6, dated Jan. 21, 2017, 1 page.

* cited by examiner

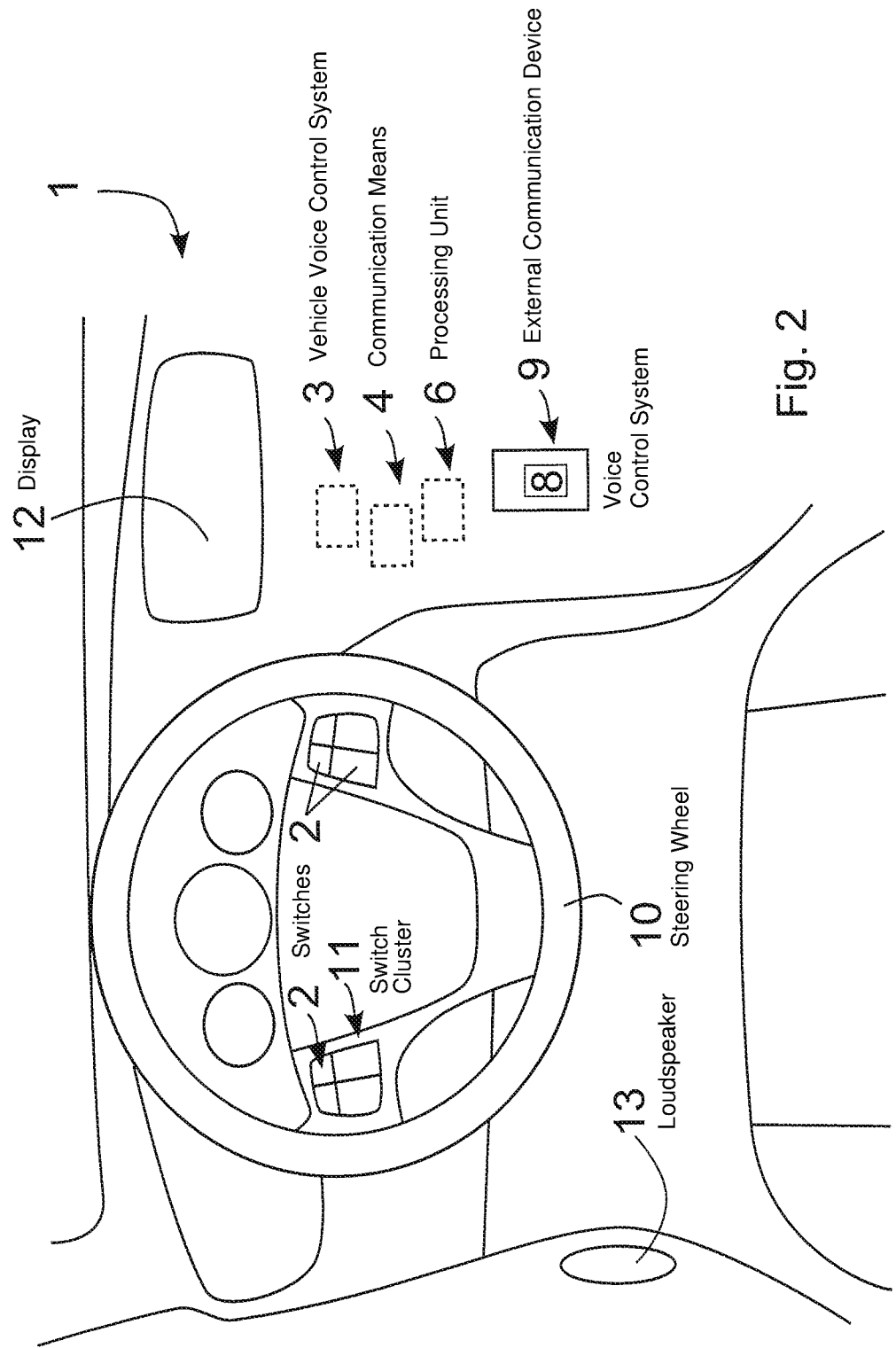

ARRANGEMENT FOR FACILITATING SELECTION AND ACTIVATION OF A VOICE CONTROL SYSTEM BY A VEHICLE OPERATOR

CROSS-REFERENCE TO RELATED APPLICATIONS

This application claims priority to European Patent Application No. 13151988.6 filed Jan. 21, 2013, the disclosure of which is incorporated in its entirety by reference herein.

TECHNICAL FIELD

Embodiments herein relate to an arrangement for facilitating selection and activation of a voice control system by a vehicle operator. Embodiments herein further relate to a vehicle comprising an arrangement for facilitating selection and activation of a voice control system by a vehicle operator.

BACKGROUND

In order to facilitate for vehicle operators to interact with different systems in the vehicle, some vehicles are provided with a vehicle voice control system. Thanks to the voice control system, the driver can use his/her voice to control functions in the different systems. He can activate the voice control system and read an address loud and the voice control system interprets his/her voice and sends the interpretation as a signal to the navigation system, whereby the navigation system presents the address on a display.

In addition to voice control systems in vehicles, mobile phones are often equipped with voice control systems. If a user for example says a sentence and the name of a contact in the phone's address book, the voice control system transfers the sentence into a text message which is sent to the contact.

US2005098417A1 discloses a vehicle switch apparatus in which a paddle is provided with one button that initiates a call from a telephone installed in the vehicle and one button that activates a vehicle voice recognition apparatus. In other vehicles, an additional button for activation of a voice control system is mounted after assembly of the vehicle.

SUMMARY

Embodiments herein aim to facilitate for a vehicle operator that would like to select and activate a voice control system.

According to an aspect, the object is achieved by a an arrangement for facilitating selection and activation of a voice control system by a vehicle operator, the arrangement comprising a switch, selectively switchable between a first switch position and a second switch position, a vehicle voice control system and communication means, wherein the switch is arranged to emit a signal when switched between switch positions, and in that the arrangement further comprises a processing unit arranged to interpret the signal and, based on the interpretation of the signal, perform a selection of one of the vehicle voice control system or a voice control system of an external communication device to be activated, and communicate, via the communication means, an activation signal to the voice control system selected.

Since the switch is arranged to emit a signal when switched between switch positions and in that the arrangement further comprises a processing unit arranged to interpret the signal and, based on the interpretation of the signal, perform a selection of one of the vehicle voice control system or a voice control system of an external communication device to be activated, and communicate, via the communication means, an activation signal to the voice control system selected, a user can use the same switch for activation of different voice control systems.

This is advantageous in several different aspects. Since dashboards, centerstacks and steering wheels in vehicles often are arranged with numerous control switches and buttons, grouped together or arranged separately, it is difficult to design a user interface that allows operators to easily distinguish between different controls, steering different functions.

With one switch instead of two for controlling the activation of both a vehicle voice control system and a voice control system of an external communication device, one less button is needed in the user interface. A user therefore instantly knows the position of the switch for activation of a voice control system, irrespective of which system he/she would like to activate. With dual functionality built in the same switch the complexity of the user interface in the vehicle is decreased. One switch for controlling one main function—the activation of a voice control system—enhances the possibility for the operator to cognitively connect the switch with the function it is adapted to control.

This results in an arrangement that facilitates for a vehicle operator to select and activate a voice control system, and therefore the above mentioned object is achieved.

In addition to the abovementioned advantages, the use of one and same switch for selection and activation of two different voice control systems is also advantageous since no extra button is needed in vehicles not provided with activations means for a voice control system of an external communication device. Thus, no extra-switch has to be installed, for example on the steering wheel, after the vehicle is assembled. This means that risks that can occur if such an installation is done without consideration of for example an airbag arranged in the steering wheel is avoided.

Further, since a single switch can be used for selection and activation of two different voice control systems, physical space is saved on the surface on which the switch is arranged. This facilitates for a user that would like to interact with the switch and increases the freedom to arrange and design an improved user interface for interaction designers or car manufacturers.

According to a second aspect this is provided through an arrangement wherein one of the vehicle voice control system and the voice control system of the external communication device is arranged to be activated when the switch is brought to the second switch position during less than a predefined time limit, and that the other one of the vehicle voice control system and the voice control system of the external communication device is arranged to be activated when the switch is brought to the second switch position during at least the predefined time limit.

Since one of the vehicle voice control system and the voice control system of the external communication device is arranged to be activated when the switch is brought to the second switch position during less than a predefined time limit, and the other one of the vehicle voice control system and the voice control system of the external communication device is arranged to be activated when the switch is brought to the second switch position during at least the predefined time limit, an operator can easily activate any one of the voice control systems by touching the switch once.

A selection between the voice control systems based on how long time the switch is positioned in a selected switch position is an easy and intuitive way of interacting with the switch in order to activate one of the systems. Further, he/she does not have to change the position of his/hers hands or fingers irrespective of which system he/she would like to activate.

According to a third aspect this is provided through an arrangement wherein one of the vehicle voice control system and the voice control system of the external communication device is arranged to be activated when the switch is brought to the second switch position once with a single-click, and that the other one of the vehicle voice control system and the voice control system of the external communication device is arranged to be activated when the switch is brought to the second switch position twice with a double click Since one of the vehicle voice control system and the voice control system of the external communication device is arranged to be activated when the switch is brought to the second switch position once with a single-click, and that the other one of the vehicle voice control system and the voice control system of the external communication device is arranged to be activated when the switch is brought to the second switch position twice with a double click, an operator can easily activate any one of the voice control systems simply by a single-click or double-click A selection between the voice control systems based on the kind of click an operator is using is an easy and intuitive way of interacting with the switch in order to activate one of the systems. Further, he/she does not have to change the position of his/hers hands or fingers irrespective of which system he/she would like to activate.

According to a forth aspect this is provided through an arrangement wherein an activated voice control system further is arranged to be deactivated based on an interpretation of a selected second switch position.

Since an activated voice control system is arranged to be deactivated based on an interpretation of a selected second switch position, an operator can deactivate the active system in an easy and intuitive manner.

According to a fifth aspect this is provided through an arrangement wherein the switch is arranged as a push button selectively switchable between the first switch position and the second switch position, and that the first switch position is a rest position in which the push button is positioned when not being switched by the vehicle operator.

Since the switch is arranged as a push button, selectively switchable between the first switch position and the second switch position, and the first position is a rest position in which the push button is positioned when not being switched by the vehicle operator, an operator can feel when the push button is in the second position. Since he/she thereby instantly receives feedback regarding the position of the switch button, he does not have to look at the button for information regarding the status of the button.

According to a sixth aspect this is provided through an arrangement wherein the switch is an integrated part of a vehicle steering wheel user interface such that the switch constitutes a part of a vehicle steering wheel switch cluster, such that the switch allows the vehicle operator to activate one of the vehicle voice control system and the voice control system of the external communication device with his/her hands positioned in an ordinary steering wheel operating position.

Since the switch is an integrated part of a vehicle steering wheel user interface, such that the switch constitutes a part of a vehicle steering wheel switch cluster, the switch allows the vehicle operator to activate one of the vehicle voice control system and the voice control system of the external communication device with his/her hands positioned in an ordinary steering wheel operating position. This is advantageous from a safety aspect, since he/she can keep both hands on the wheel in order to steer the vehicle in a safe and controlled manner.

In addition, since the switch constitutes an integrated part of the existing vehicle user interface, the switch can be arranged and designed according to the same design and function criteria, such as size, visual appearance, function-indicating symbols, backlight, press-resistance, press-sound etc. as other switches and buttons in the vehicle interface. Thanks to this, a vehicle operator is provided with a homogenous and predictable user interface that he/she can interact with without drawing unnecessary focus from operating the vehicle.

According to a seventh aspect this is provided through an arrangement wherein the processing unit further is arranged to emit a signal when of one of the vehicle voice control system or the voice control system of an external communication device is activated, the signal is arranged to enable at least one of a haptic-, optical-, or acoustic feedback arrangement that provides the vehicle operator with at least one of haptic-, optical-, or acoustic feedback regarding the activation.

Since the processing unit is arranged to emit a signal when of one of the vehicle voice control system or the voice control system of an external communication device is activated, and the emitted signal is arranged to enable at least one of a haptic-, optical- or acoustic feedback arrangement, a vehicle operator is provided with at least one of haptic-, optical-, or acoustic feedback regarding the status of the selection and activation of any one of the voice control systems. Tanks to the haptic-, optical-, or acoustic feedback, he/she can concentrate on driving the vehicle instead of visually making sure that he/she interacts with the intended switch. Thanks to this, the safety can be enhanced.

According to an eight aspect this is provided through an arrangement wherein the activation signal is communicated via at least one of a Bluetooth, Wi-Fi, CAN bus or other wired communication means.

Since the activation signal is communicated via at least one of a Bluetooth, Wi-Fi, CAN bus or other wired or wireless communication means, the activation signal is communicated in a reliable and standardized manner, where voice control systems in many different external communication devices can be communicated with.

According to a ninth aspect this is provided through a vehicle wherein the vehicle comprises an arrangement for facilitating selection and activation of a voice control system by a vehicle operator. Since the vehicle comprises an arrangement for facilitating selection and activation of a voice control system by a vehicle operator, the operator can select and activate a desired voice control system in an intuitive and easy manner.

Further features of, and advantages with, the embodiments herein will become apparent when studying the appended claims and the following detailed description. Those skilled in the art will realize that different features of the embodiments herein can be combined to create embodiments other than those described in the following, without departing from the scope of the appended claims.

BRIEF DESCRIPTION OF THE DRAWINGS

The various aspects of embodiments herein, including its particular features and advantages, will be readily understood from the following detailed description and the accompanying drawings, in which:

FIG. 2 illustrates an arrangement for facilitating selection and activation of a voice control system according to some embodiments.

DETAILED DESCRIPTION

Figure 1:
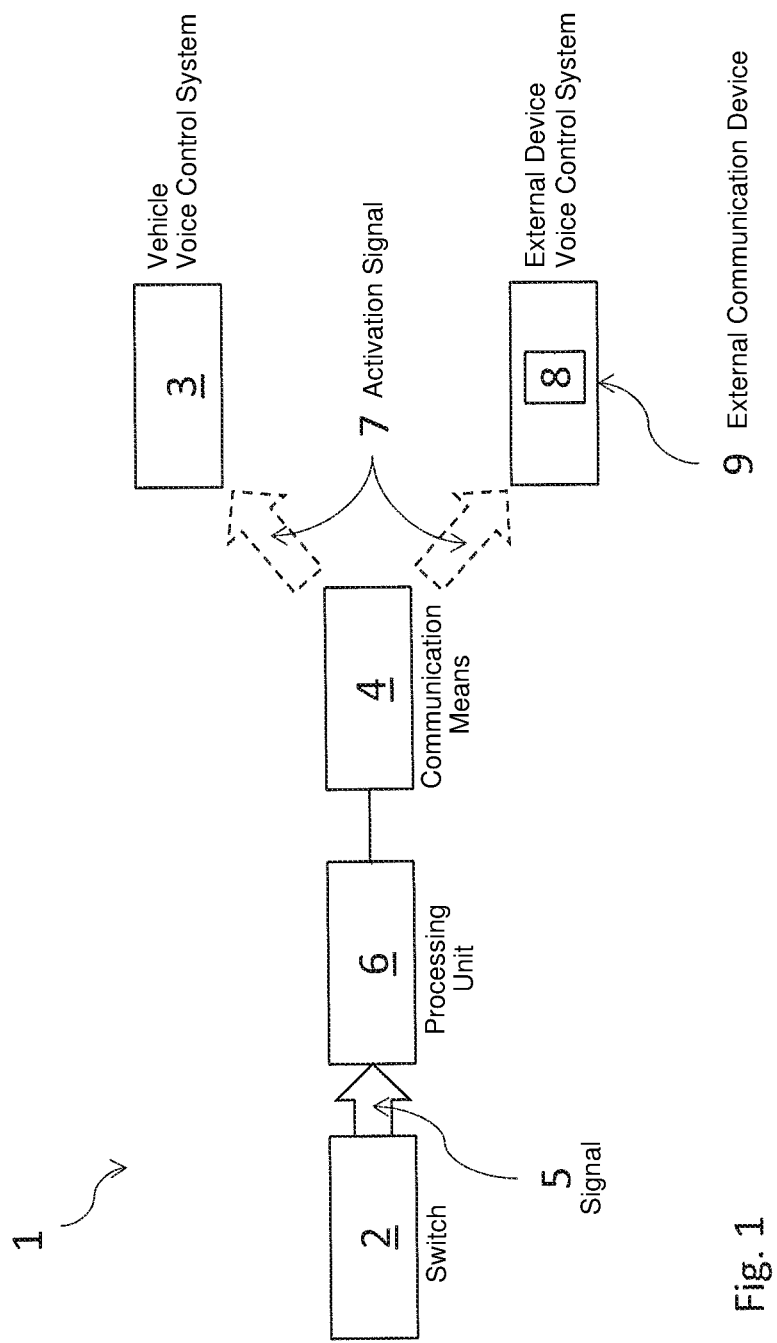
FIG. 1 illustrates an arrangement for facilitating selection and activation of a voice control system according to some embodiments.

As required, detailed embodiments are disclosed herein. However, it is to be understood that the disclosed embodiments are merely exemplary and that various and alternative forms are possible. The figures are not necessarily to scale and features may be exaggerated or minimized to show details of particular components. Therefore, specific structural and functional details disclosed herein are not to be interpreted as limiting, but merely as a representative basis for teaching one skilled in the art. Well-known functions or constructions will not necessarily be described in detail for brevity and/or clarity.

FIG. 1 illustrates an arrangement 1 for facilitating selection and activation of a voice control system by a vehicle operator according to some embodiments. The arrangement 1 comprises a switch 2, selectively switchable between a first switch position P1 (not shown) and a second switch position P2 (not shown), a vehicle voice control system 3 and communication means 4. The switch 2 is arranged to emit a signal 5 when switched between switch positions. The arrangement 1 further comprises a processing unit 6 arranged to interpret the signal 5 and, based on the interpretation of the signal 5, perform a selection of one of the vehicle voice control system 3 or a voice control system 8 of an external communication device to be activated, and communicate, via the communication means 4, an activation signal 7 to the voice control system (3, 8) selected. Since the activation signal 7 is sent to one of the voice control systems, the arrows illustrating activation signal 7 is dashed in FIG. 1.

The switch 2 is arranged to emit a signal 5 when it is switched between the switch positions. The signal 5 is for example an electrical signal, arranged to be emitted when a sensor detects a change of position of the switch 2. The signal is sent via Bluetooth, Wi-Fi, CAN bus or other wired or wireless communication means, or via a combination of these.

The processing unit 6 is arranged to receive and interpret the signal 5 from the switch 2. The processing unit 6 is for example an electronic computer of any kind, programmed to execute arithmetic and logical operations, and can include a CPU, memory units, and integrated circuits. The processing unit 6 can be a separate processing unit or a processing unit integrated in any other vehicle processing unit. The processing unit 6 can be a part of a vehicle infotainment unit, such as an infotainment head unit, IHU. According to some embodiments, the processing unit 6 is replaced by a connection to an IHU located in a software cloud.

The processing unit 6 is further arranged to communicate the activation signal 7 to one of the vehicle voice control system 3 or a voice control system 8 of an external communication device 9. The activation signal 7 is communicated via at least one of a Bluetooth, Wi-Fi, CAN bus or other wired or wireless communication means. The communication means can be connected to or integrated with the processing unit 6. Different communication means can be used depending on which voice control system the activation signal 7 is sent to. For example, if the activation signal 7 is sent from the processing unit 6 to the vehicle voice control system 3, wiring can be used as communication means. If the activation signal 7 is sent from the processing unit 6 to the voice control system 8 of an external communication device 9, Bluetooth or Wi-Fi can be used. The activation signal 7 is sent directly between the processing unit 6 to any of the voice control systems or via the IHU.

The vehicle voice control system 3 can be a separate system, alternatively is the vehicle voice control system 3 a part of another system in the vehicle. According to some embodiments the vehicle voice control system 3 is connected to or constitutes a part of the IHU. Further, the vehicle voice control system 3 is a speaker independent or speaker dependent voice control system that translates words and sentences a user speaks into signals and commands. The vehicle voice control system 3 can also be referred to as a speech recognition system.

The voice control system 8 of an external communication device 9 can be any kind of system adapted to let a user control functions by voice, such as voice control systems arranged in a mobile phone, a cellular phone, a Personal Digital Assistant (PDA) equipped with radio communication capabilities, a smartphone, a laptop or personal computer (PC), a tablet, a portable electronic radio communication device or the like.

FIG. 2 illustrates the arrangement 1 for facilitating selection and activation of a voice control system according to some embodiments. The arrangement 1 comprises the switch 2, selectively switchable between switch positions P1, P2, the vehicle voice control system 3 and communication means 4. According to some embodiments, the first position P1 is slightly closer to a seated vehicle operator, such that the vehicle operator can push the switch 2 forward in a longitudinal direction of the vehicle in order to position the switch 2 in the second position P2.

The switch 2 is arranged at or in the vicinity of a vehicle steering wheel 10, a dashboard, a vehicle door interior, a centerstack or any other suitable position such that the switch 2 is within reach of a seated vehicle operator. The switch 2 can be a push button or a tilt button, and the switch 2 is arranged to emit the signal 5 when switched between the first switch position P1 and the second switch position P2.

The processing unit 6 is arranged to interpret the signal 5 and, based on the interpretation of the signal 5, communicate, via the communication means 4, the activation signal 7 to one of the vehicle voice control system 3 or the voice control system 8 of the external communication device 9. The processing unit 6 and the communication means 4 are arranged in any suitable location in the vehicle, such as in the vicinity of the dashboard, the centerstack or the IHU.

The selection of voice control system to be activated is based on the interpretation of a selected second switch position P2. The interpretation is for example based on the amount of time the switch 2 is positioned in the second position P2. For example, the vehicle voice control system 3 is arranged to be activated when the switch 2 is brought to the second switch position P2 during less than the predefined time limit TL, and the voice control system 8 of the external communication device 9 is arranged to be activated when the switch 2 is brought to the second switch position P2 during at least the predefined time limit TL. Alternatively, the voice control system 8 of the external communication device 9 is arranged to be activated when the switch 2 is brought to the second switch position P2 during less than the predefined time limit TL, and the vehicle voice control system 3 is arranged to be activated when the switch 2 is brought to the second switch position P2 during at least the predefined time limit TL.

According to some embodiments, the switch 2 is arranged to emit a signal 5 when switched from the first switch position P1 to the second switch position P2. According to some embodiments, the switch 2 is arranged to emit a signal 5 when returning from the second switch position P2 to the first switch position P1. According to some embodiments, the switch 2 automatically returns from the second position P2 to the first position P1 whereby the signal 5 is emitted. This is also referred to as "button release" or "switch release".

The interpretation can be based on the characteristic of the switch movement to/from the second position P2. For example, if the switch 2 is brought to the second switch position P2 once with a single-click, the vehicle voice control system 3 is arranged to be activated, and if the switch 2 is brought to the second switch position P2 twice with a double click, the voice control system 8 of the external communication device 9 is arranged to be activated. Alternatively, if the switch 2 is brought to the second switch position P2 once with a single-click, the voice control system 8 of the external communication device 9 is arranged to be activated and if the switch 2 is brought to the second switch position P2 twice with a double click, the vehicle voice control system 3 is arranged to be activated.

According to some embodiments the switch 2 is arranged as a push button, selectively switchable between the first switch position P1 and the second switch position P2. The first position P1 can be a rest position, in which the push button is positioned when not being switched by the vehicle operator. The size of the push button is selected such that it easy for a vehicle operator to find and use the button, and a surface of the push button facing the vehicle operator can be curved, concave and/or convex, in order to guide a finger of the vehicle operator.

According to some embodiments the switch 2 is an integrated part of a vehicle steering wheel 10 user interface such that the switch 2 constitutes a part of a vehicle steering wheel switch cluster 11. The switch 2 is arranged to allow the vehicle operator to activate one of the vehicle voice control system 3 and the voice control system 8 of the external communication device 9 with his/her hands positioned in an ordinary steering wheel operating position.

According to some embodiments the processing unit 6 is arranged to emit a signal when of one of the vehicle voice control system 3 or the voice control system 8 of an external communication device 9 is activated. The signal is arranged to enable at least one of a haptic-, optical-, or acoustic feedback arrangement, and thereby the vehicle operator is provided with at least one of haptic-, optical-, or acoustic feedback regarding the activation. The switch 2 or steering wheel 10 can be arranged to provide the vehicle operator with the haptic feedback. According to some embodiments a display 12 is arranged to provide the vehicle operator with optical feedback, and according to some embodiments, an audio system that includes one or more loudspeakers 13 provides the vehicle operator with acoustic feedback regarding the activation.

According to some embodiments the vehicle operator is allowed to set up the arrangement 1 for facilitating selection and activation of a voice control system according to his/hers preferences, such that a selected voice control system is activated and/or deactivated either based on time or based on the characteristic of the switch movement to/from the second position P2.

After activation of the vehicle voice control system 3, a user can for example input a destination to the vehicle voice control system 3 with his/her voice. The information is then sent to a navigation system, where the destination and/or suggested paths to the destination are displayed on the vehicle display 12. The user can then be guided, by audio and/or visually through a map on the display, to the destination. Alternatively, the user orally inputs information in order to control functions in an entertainment system, infotainment system, communication system, safety system or any other system arranged to be controlled by voice or speech.

Although the aspects has been described with reference to example embodiments, many different alterations, modifications and the like will become apparent for those skilled in the art. Therefore, it is to be understood that the foregoing is illustrative of various example embodiments and the scope of the appended claims is not to be limited to the specific embodiments disclosed and that modifications to the disclosed embodiments, combinations of features of disclosed embodiments as well as other embodiments are intended to be included within the scope of the appended claims.

As used herein, the term "comprising" or "comprises" is open-ended, and includes one or more stated features, elements, steps, components or functions but does not preclude the presence or addition of one or more other features, elements, steps, components, functions or groups thereof.

What is claimed is:

1. A system for facilitating selection and activation of a voice control system by a vehicle operator, the system comprising:
   a switch selectively switchable between a first switch position ($P_1$) and a second switch position ($P_2$) and arranged to emit a signal when switched between the switch positions ($P_1$, $P_2$);
   a vehicle voice control system;
   communication means; and
   a processing unit arranged to interpret the signal and, based on the interpretation of the signal, perform a selection of one of the vehicle voice control system or a voice control system of an external communication device to be activated, and communicate, via the communication means, an activation signal to the voice control system selected;
   wherein one of the vehicle voice control system and the voice control system of the external communication device is arranged to be activated when the switch is brought to the second switch position ($P_2$) during less than a predefined time limit ($T_L$), and that the other one of the vehicle voice control system and the voice control system of the external communication device is arranged to be activated when the switch is brought to the second switch position ($P_2$) during at least the predefined time limit ($T_L$).

2. The system according to claim 1 wherein one of the vehicle voice control system and the voice control system of the external communication device is arranged to be activated when the switch is brought to the second switch position ($P_2$) once with a single-click, and that the other one of the vehicle voice control system and the voice control system of the external communication device is arranged to be activated when the switch is brought to the second switch position ($P_2$) twice with a double click.

3. The system according to claim 1 wherein an activated voice control system further is arranged to be deactivated based on an interpretation of selected second switch position ($P_2$).

4. The system according to claim 1 wherein the switch is arranged as a push button selectively switchable between the first switch position ($P_1$) and the second switch position ($P_2$), and that the first switch position ($P_1$) is a rest position in which the push button is positioned when not being switched by the vehicle operator.

5. The system according to claim 1 wherein the switch is an integrated part of a vehicle steering wheel user interface such that the switch constitutes a part of a vehicle steering wheel switch cluster, such that the switch allows the vehicle operator to activate one of the vehicle voice control system and the voice control system of the external communication device with his/her hands positioned in an ordinary steering wheel operating position.

6. The system according to claim 1 wherein the processing unit further is arranged to emit a signal when of one of the vehicle voice control system or the voice control system of an external communication device is activated, the signal is arranged to enable at least one of a haptic, optical, or acoustic feedback arrangement that provides the vehicle operator with at least one of haptic, optical, or acoustic feedback regarding the activation.

7. The system according to claim 1 wherein the activation signal is communicated via at least one of a Bluetooth, Wi-Fi, CAN bus or other wired communication means.

8. The system of claim 1 further comprising a vehicle.

9. A system for facilitating selection and activation of a voice control system by a vehicle operator, the system comprising:
a switch selectively switchable between a first switch position ($P_1$) and a second switch position ($P_2$) and arranged to emit a signal when switched between the switch positions ($P_1$, $P_2$); and
a processing unit arranged to select, based on an interpretation of the signal, one of a vehicle voice control system or a voice control system of an external communication device and to communicate an activation signal to the selected one of the vehicle voice control system or the external communication device voice control system;
wherein one of the vehicle voice control system and the voice control system of the external communication device is arranged to be activated when the switch is brought to the second switch position ($P_2$) during less than a predefined time limit ($T_L$), and that the other one of the vehicle voice control system and the voice control system of the external communication device is arranged to be activated when the switch is brought to the second switch position ($P_2$) during at least the predefined time limit ($T_L$).

10. The system according to claim 9 wherein one of the vehicle voice control system and the voice control system of the external communication device is arranged to be activated when the switch is brought to the second switch position ($P_2$) once with a single-click, and that the other one of the vehicle voice control system and the voice control system of the external communication device is arranged to be activated when the switch is brought to the second switch position ($P_2$) twice with a double click.

11. The system according to claim 9 wherein an activated voice control system further is arranged to be deactivated based on an interpretation of selected second switch position ($P_2$).

12. The system according to claim 9 wherein the switch is arranged as a push button selectively switchable between the first switch position ($P_1$) and the second switch position ($P_2$), and that the first switch position ($P_1$) is a rest position in which the push button is positioned when not being switched by the vehicle operator.

13. The system according to claim 9 wherein the switch is an integrated part of a vehicle steering wheel switch cluster, such that the switch allows the vehicle operator to activate one of the vehicle voice control system and the voice control system of the external communication device with his/her hands positioned in an ordinary steering wheel operating position.

14. The system according to claim 9 wherein the processing unit further is arranged to emit a feedback signal when of one of the vehicle voice control system or the voice control system of an external communication device is activated, the feedback signal arranged to enable at least one of a haptic, optical, or acoustic feedback arrangement that provides the vehicle operator with at least one of haptic, optical, or acoustic feedback regarding the activation.

15. The system according to claim 9 wherein the activation signal is communicated via at least one of a Bluetooth, Wi-Fi, CAN bus or other wired communication means.

16. The system of claim 9 further comprising a vehicle.

* * * * *